(12) United States Patent
Büchner

(10) Patent No.: US 10,940,642 B2
(45) Date of Patent: Mar. 9, 2021

(54) APPARATUS FOR MANUFACTURING THREE-DIMENSIONAL OBJECTS

(71) Applicant: CONCEPT LASER GMBH, Lichtenfels (DE)

(72) Inventor: David Büchner, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 0 days.

(21) Appl. No.: 16/046,896

(22) Filed: Jul. 26, 2018

(65) Prior Publication Data

US 2019/0030815 A1 Jan. 31, 2019

(30) Foreign Application Priority Data

Jul. 28, 2017 (EP) ..................................... 17183800

(51) Int. Cl.
| | |
|---|---|
| *B29C 64/371* | (2017.01) |
| *B33Y 30/00* | (2015.01) |
| *B29C 64/153* | (2017.01) |
| *B29C 64/364* | (2017.01) |
| *B29C 64/25* | (2017.01) |
| *B29C 64/268* | (2017.01) |

(Continued)

(52) U.S. Cl.
CPC .......... *B29C 64/371* (2017.08); *B22F 3/1055* (2013.01); *B29C 64/153* (2017.08); *B29C 64/25* (2017.08); *B29C 64/268* (2017.08); *B29C 64/364* (2017.08); *B33Y 30/00* (2014.12); *B33Y 40/00* (2014.12)

(58) Field of Classification Search
CPC ...... B29C 64/371; B29C 64/364; B29C 64/25
See application file for complete search history.

(56) References Cited

U.S. PATENT DOCUMENTS

| | | | |
|---|---|---|---|
| 8,137,739 B2 | 3/2012 | Philippi et al. | |
| 2006/0192322 A1* | 8/2006 | Abe | B22F 3/1055 264/497 |

(Continued)

FOREIGN PATENT DOCUMENTS

| | | |
|---|---|---|
| CN | 105517779 A | 4/2016 |
| CN | 106132669 A | 11/2016 |

(Continued)

OTHER PUBLICATIONS

Combined Chinese Search Report and Office Action Corresponding to Application No. 201711163047 dated Apr. 26, 2020.

(Continued)

*Primary Examiner* — Jacob T Minskey
*Assistant Examiner* — Virak Nguon
(74) *Attorney, Agent, or Firm* — Dority & Manning, P.A.

(57) ABSTRACT

Apparatus (1) for additively manufacturing of three-dimensional objects by means of successive layerwise selective irradiation and consolidation of layers of a build material (2) which can be consolidated by means of an energy beam, with a process chamber (3) comprising at least a first and a second region (4, 5), wherein in the first region (4) build material (2) is applied and irradiated on a build plane (6), wherein a stream generating unit is provided that is configured to generate a stream of process gas (10) in the process chamber (3) separating the first region (4) from the second region (5).

16 Claims, 2 Drawing Sheets

Figure 1:
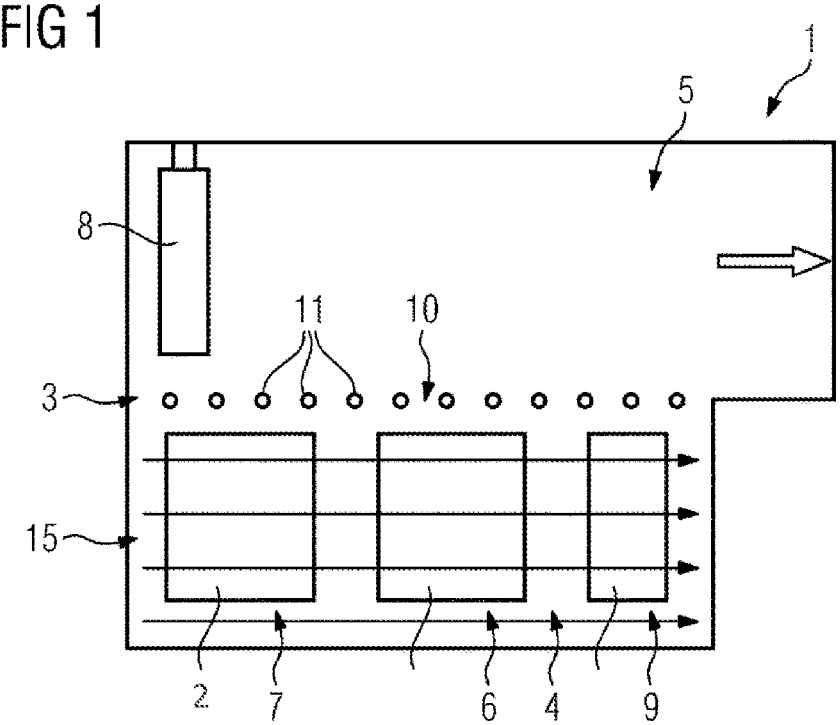

(51) Int. Cl.
  *B33Y 40/00* (2020.01)
  *B22F 3/105* (2006.01)

(56) References Cited

U.S. PATENT DOCUMENTS

| | | | |
|---|---|---|---|
| 2014/0271965 A1* | 9/2014 | Ferrar | B29C 64/364 |
| | | | 425/163 |
| 2015/0108695 A1* | 4/2015 | Okada | B29C 64/135 |
| | | | 264/497 |
| 2015/0174823 A1* | 6/2015 | Wiesner | B22F 3/1055 |
| | | | 264/497 |
| 2015/0306666 A1* | 10/2015 | Honda | B22F 3/1055 |
| | | | 425/78 |
| 2017/0216916 A1 | 8/2017 | Nyrhilä et al. | |
| 2018/0065303 A1* | 3/2018 | Schade | B33Y 10/00 |
| 2019/0262901 A1* | 8/2019 | Huebinger | B29C 64/371 |

FOREIGN PATENT DOCUMENTS

| | | | | |
|---|---|---|---|---|
| DE | 102010052206 A1 * | 5/2012 | | B33Y 40/00 |
| DE | 102010052206 A1 | 5/2012 | | |
| DE | 102014205875 A1 | 1/2015 | | |
| DE | 102014205875 A1 * | 10/2015 | | B28B 17/0081 |
| JP | 2008/508129 A | 3/2008 | | |
| WO | 2017055207 A1 | 4/2017 | | |

OTHER PUBLICATIONS

European Search Report Corresponding to Application No. 17183800 dated Jan. 10, 2018.
Machine Translated Japanese Office Action Corresponding to Application No. 2018011429 dated Jan. 18, 2019.
European Search Report Corresponding to Application No. 19191829 dated Nov. 13, 2019.

* cited by examiner

APPARATUS FOR MANUFACTURING THREE-DIMENSIONAL OBJECTS

CROSS-REFERENCE TO RELATED APPLICATIONS

This application claims priority to European Patent Application serial no. 17 183 800.6 filed Jul. 28, 2017, the contents of which are incorporated herein by reference in their entirety as if set forth verbatim.

DESCRIPTION

The invention relates to an apparatus for additively manufacturing of three-dimensional objects by means of successive layerwise selective irradiation and consolidation of layers of a build material which can be consolidated by means of an energy beam, with a process chamber comprising at least a first and a second region, wherein in the first region build material is applied and irradiated on a build plane.

Such apparatuses are well-known from prior art, wherein an energy beam is generated to selectively irradiate layers of a build material. The build material is consolidated by the irradiation, wherein an object can be built by successively irradiating and consolidating the layers of build material to form the object. The build material, which is typically in powder form, is distributed and/or carried over throughout the process chamber of the apparatus as the build material is a for example partly evaporated or stirred up in the manufacturing process.

Thus, the build material particles that are conveyed via a gas stream or via transfer upon contact may contaminate regions in the process chamber that should be kept free of build material. The undesired deposition of stirred up build material in the process chamber may disturb or impair the manufacturing process, in particular the continuous operation of the manufacturing process, as the respective regions in which build material is not desired, have to be cleaned or maintained.

Since components of the apparatus may have to pass from the first region into the second region and vice versa, a separation of the first region from the second region is only possible to a limited extent, as a passageway for a respective component, for example a tool carrier, in particular a coater, has to be kept open or accessible, respectively.

Therefore, it is an object to provide an apparatus, wherein the separation of at least two regions in the process chamber is improved.

The object is inventively achieved by an apparatus according to the claims. Advantageous embodiments of the invention are subject to the dependent claims.

The apparatus described herein is an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The apparatus comprises a number of functional units which are used during its operation. Exemplary functional units are a process chamber, an irradiation device which is configured to selectively irradiate a build material layer disposed in the process chamber with at least one energy beam, and a stream generating device which is configured to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

Additionally or alternatively to the stream generating unit already described above the invention is based on the idea that the apparatus comprises a stream generating unit that is configured to generate a stream of process gas in the process chamber separating the first region from the second region. Hence, the stream of process gas generated functions as a separation located between the first region and the second region. Particles of build material and/or residues that are generated in the irradiation process, wherein the energy beam irradiates the build material, cannot pass from the first region into the second region or vice versa, as such particles and/or residues cannot pass through the generated stream of process gas.

Thus, the particles and/or residues that are generated in one region are kept inside the respective region and cannot contaminate an adjacent region in which build material is not desired. Therefore, there is no or a reduced need for cleaning and/or maintaining the second region since the powdery build material cannot pass the separation generated by the stream of process gas between the first region and the second region. In the scope of this application for the ease of reference the first region is referred to as the region in which the build process takes place, i.e. in which region the build material is irradiated. Self-evidently, it is also possible to define the regions reversely, e.g. the second region as the region in which the build process takes place.

Advantageously, the stream of process gas is generated so as to avoid that a particle and/or a residue generated in the irradiation process crosses from the first region into the second region, thereby passing the stream of process gas. Thus, the particles or residues generated in the irradiation process cannot pass from the first region into the second region via the area that is streamed by the stream of process gas, since the stream of process gas receives the particles/residues and conveys them along the stream path. Therefore, the stream of process gas limits the first region and creates a "wall" for the particles or residues so as to keep them in the first region.

According to an embodiment of the apparatus, the stream generating unit is configured to generate the stream of process gas vertically and/or horizontally separating the first and the second region that are located adjacent in the process chamber. Hence, the separation generated by the stream generating unit is arranged between the first and the second region like a "wall" separating the two regions from another. In the end, the streaming direction of the stream of process gas that is generated by the stream generating unit is arbitrary as long as it is ensured that a separation is generated between the first and the second region to avoid particles and/or residues to pass from the first region into the second region. In particular, the stream of process gas may be generated streaming vertically and/or horizontally through the process chamber, wherein of course, the stream of process gas may be generated streaming under a predefined angle relative to a wall of the process chamber, i.e. relative to the first and/or the second region.

Particularly, the process gas is streamed from a bottom region to a top region of the process chamber. Thus, the stream of process gas is generated in that the process gas essentially streams vertically and upwards through the process chamber so as to avoid stirring up build material inside the process chamber. The vertical streaming direction is advantageous compared to a horizontal streaming direction, since a stream of process gas parallel to a surface of build material, e.g. a build plane, would be more likely to stir up build material than a stream of process gas streaming vertically, in particular upwards.

Advantageously, the apparatus comprises at least one process gas outlet, wherein the generated stream of process gas is guided into the process chamber via the process gas outlet. Of course, the process gas outlet can also be regarded or termed or deemed as a process gas inlet, since the process gas is guided into the process chamber via the process gas outlet/inlet, wherein the process gas stream out of the process gas outlet/inlet into the process chamber. The at least one process gas outlet may be built of an arbitrary shape with respect to the streaming profile that has to be generated, wherein in particular the at least one outlet is built as a slit or a nozzle allowing for a defined distribution of the stream of process gas inside the process chamber assuring the separation of the two regions and therefore avoiding a contamination of the second region with build material or other residues.

According to an embodiment of the apparatus, at least two sub-streams of process gas are generated by the stream generating unit streaming into the process chamber via at least two different process gas outlets, wherein the sub-streams are generated adjacent or overlapping. Thus, it is ensured that the stream of process gas, i.e. the separation, between the first and the second region is generated without a break or gapless. Hence, it is avoided that particles or residues can pass from the first region into the second region via gaps or breaks between two sub-streams. Also, different process gas outlets may be built with different shape so as to allow for a combination of different process gas outlets, i.e. process gas outlets generating different streaming profiles of process gas streaming through the respective process gas outlet into the process chamber.

Further, it is possible to have at least two streams of process gas that are generated in succession, wherein a particle generated in the first region would have to pass the two streams of process gas to reach the second region. For example, multiple process gas outlets may be built as slits and arranged in succession, so as to generate multiple "walls" by the process gas streaming through the process gas outlets. This allows for an additional means of protection to avoid particles or residues to reach the second region.

According to another embodiment of the apparatus, the stream of process gas is generated in that a particle in the first region moving into the stream of process gas towards the second region is circulated back into the first region. Thus, a circulation of the process gas is generated to a defined degree, wherein a particle and/or residues that is received in, i.e. pulled into the stream of process gas is circulated back to the first region and therefore, cannot pass from the first region into the second region of the process chamber.

The apparatus can further be improved by an additional stream generating unit or the stream generating unit that is configured to generate a stream of process gas streaming over the build plane and being capable of being loaded with particles and/or residues. This embodiment enables conveying the particles and/or residues where they are generated, as the generated stream of process gas streams over the build plane and is charged or loaded with the generated particles and/or residues. By guiding or transporting the generated particles and/or residues away, the amount of particles and/or residues that is moving inside the process chamber and/or potential moving towards the second region can be reduced.

Additionally, the stream generating unit or the additional stream generating unit is configured to generate a suction stream of process gas from the process chamber. By way of this embodiment the generated suction stream purges the process gas inside the process chamber by removing particles and/or residues from the process chamber. Of course, a filter unit or the like can be located downstream of the suction stream so as to clean the process gas streaming through the filter unit from particles and/or residues.

Further, the stream of process gas is generated in that a particle and/or residues in the first region moving into the stream of process gas towards the second region is circulated into the created suction stream of process gas. Thus, the purge of the process chamber can further be improved, as particles and/or residues that are moving towards the second region are guided towards the suction stream of process gas in a defined way and therefore, are removed from the process chamber.

The apparatus can further be improved in that the stream of process gas separating the regions is passable by a tool carrier, in particular a coater. The generated stream of process gas streaming inside the process chamber separating the process chamber into at least a first and a second region can be passed by a tool carrier that is inserted from the second region into the first region or vice versa. The tool carrier may for example be equipped with a coating tool used for applying build material, for example from a dose module onto the build plane of a build module. The tool carrier may be inserted into the first region passing through the separation generated by the stream of process gas, wherein the tool carrier may be moved along or across the separation without an impact on the movement of the tool carrier. The stream of process gas may be generated in that process gas is streamed essentially around the tool carrier inserted into the first region, wherein a gap and/or a break in the stream of process gas is reduced or avoided.

Additionally, when retreating the tool carrier from the first region, the stream of process gas ensures that particles and/or residues that are deposited on the tool carrier are purged off the tool carrier by the stream of process gas. Thus, a contamination of the second region via particles and/or residues that are deposited on the tool carrier and a contact transfer of build material adhered to the tool carrier is avoided.

According to another embodiment of the apparatus, a chamber separation device is provided separating the first region from the second region with the chamber separation device in a first position and generating a passageway between the first and the second region with the chamber separation device in a second position. Thus, the chamber separation device functions like a "gate" that can be selectively opened or closed, thereby generating an additional separation between the first region and the second region of the process chamber. For example, the chamber separation device can be moved into the first position, wherein the first region is separated from the second region so as to avoid particles and/or residues to pass from the first region into the second region. In the second position the chamber separation device generates a passageway through which, e.g. a tool carrier can be inserted into the first region. In particular, the chamber separation device and the stream of process gas can be provided in succession.

The apparatus can further be improved by providing a dose module and a build module and an overflow module that are located in the first region. Thus, build material can be provided by a dose module and conveyed from the dose module to a build plane of the build module, wherein surplus build material is collected in the overflow module.

Figure 2:
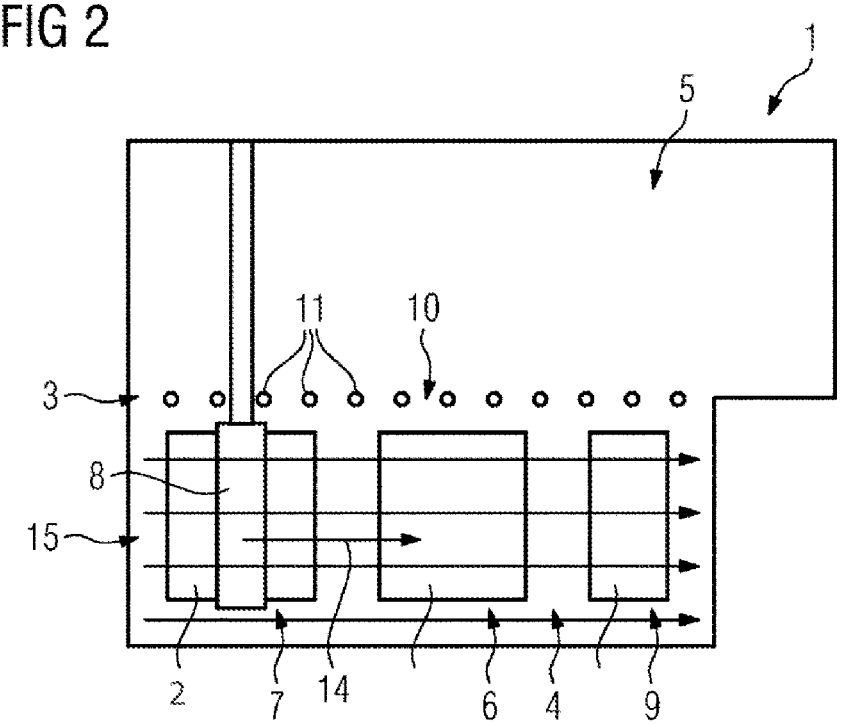
Figure 3:
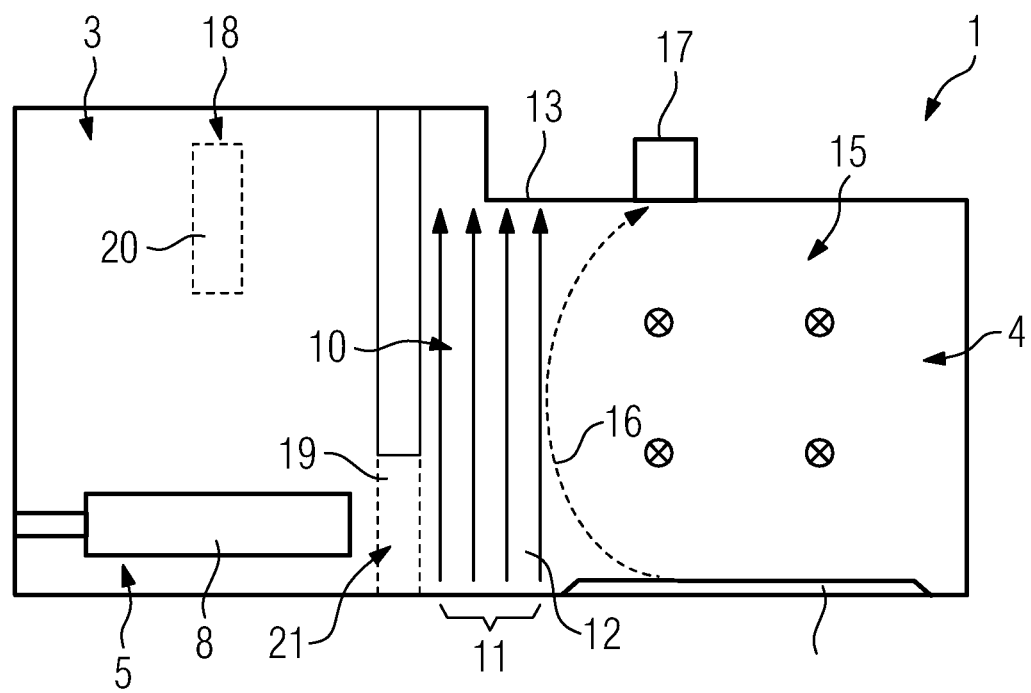

Exemplary embodiments of the invention are described with reference to the Fig. The Fig. are schematic diagrams, wherein FIG. 1 shows an inventive apparatus in a top view;
FIG. 2 shows the apparatus of FIG. 1 in a coating step; and
FIG. 3 shows the apparatus of FIG. 1 in a side view.

FIG. 1 shows an apparatus 1 for additively manufacturing of three-dimensional objects by means of successive layerwise selective irradiation and consolidation of layers of a powdery build material 2 which can be consolidated by means of an energy beam. The apparatus 1 comprises a process chamber 3 comprising at least a first region 4 and a second region 5.

The first region 4 comprises a build plane 6 in which the build material 2 is irradiated by the energy beam. In other words, in the first region 4 the build material 2 is provided by a dose module 7, wherein the build material 2 is applied via a coater 8 onto the build plane 6, wherein excess build material 2 is collected in an overflow module 9. As can further be derived from the FIG. 1, 2, the coater 8 can be selectively moved from the second region 5 into the first region 4, wherein FIG. 1 depicts the coater 8 in a position in the second region 5 and FIG. 2 depicts the coater 8 in a coating position in the first region 4.

The apparatus 1 further comprises a stream generating unit (not shown) that is configured to generate a stream of process gas 10 comprising a plurality of sub-streams 11. The sub-streams 11 are generated by multiple openings, for example nozzles or slits, located in a bottom region 12 of the process chamber 3, wherein the nozzles can also be regarded or termed as process gas outlets that generate the respective adjacent sub-streams 11, in particular overlapping each other.

The stream of process gas 10 separates the first region 4 from the second region 5. In other words, the stream of process gas 10 generates a "wall" by vertically streaming from the bottom region 12 of the process chamber 3 to a top region 13 of the process chamber 3. Thus, particles and/or residues that are generated in the first region 4 are kept inside the first region 4 and cannot pass from the first region 4 into the second region 5.

The stream of process gas 10 is passable by the coater 8, wherein the coater 8 may be inserted and retreated in an arbitrary part or sub-stream 11 of the stream of process gas 10. Especially, when retreating the coater 8 from the first region 4, non-consolidated build material 2, in particular particles or residues generated in the irradiation process or by stirring up build material 2 is removed from the coater 8 as it is passed through the stream of process gas 10. In particular, the particles and/or residues deposited on or adhered to the coater 8 are sprayed off the coater 8 via the stream of process gas 10.

FIG. 2 depicts the coater 8 in a coating step, wherein the coater 8 is moved from the dose module 7 in coating direction (depicted by an arrow 14) conveying build material 2 from the dose module 7 to the build plane 6, wherein surplus build material 2 is conveyed to and collected in the overflow module 9. FIG. 2 further shows that the stream generating unit (or an additional stream generating unit) generates a stream of process gas 15 that streams over the dose module 7 and the build plane 6 and the overflow module 9 being capable of being charged or loaded with particles and/or residues generated in the irradiation process.

FIG. 3 shows a side view of the apparatus 1, wherein a dashed line 16 depicts that particles and/or residues that are generated in the first region 4 and are moving towards the second region 5 are circulated back into the first region 4, wherein an additional stream generating unit 17 (or the same stream generating unit) is configured to generate a suction stream of process gas removing process gas from the process chamber 3, wherein particles and/or residues are filtered from the process gas and are removed from the process chamber 3. Of course, the process gas can be recycled via the stream of process gas 10 and/or the stream of process gas 15 into the process chamber 3.

FIG. 3 further shows that between the first region 4 and the second region 5 a chamber separation device 18 is provided that is movable between a first position 19 and a second position 20. With the chamber separation device 18 in the first position 19 a solid separation between the first region 4 and the second region 5 is provided. By moving the chamber separation device 18 into the second position 20 a passageway 21 is generated for a tool carrier, in particular the coater 8 allowing to pass from the second region 5 into the first region 4.

The invention claimed is:

1. An apparatus for additively manufacturing of three-dimensional objects by successive layerwise irradiation and consolidation of layers of a build material which can be consolidated by means of an energy beam, the apparatus comprising:
   a process chamber comprising a first region, a second region, and at least one process gas outlet configured to discharge a stream of process gas from a stream generating unit, wherein the stream of process gas discharged from the at least one process gas outlet vertically separates the first region from the second region, and wherein the first region comprises a dose module, a build module and an overflow module; and
   a tool carrier comprising a coater, wherein the tool carrier being selectively movable between the first region and the second region.

2. The apparatus of claim 1, wherein the stream of process gas is configured to reduce particles and/or residue generated in the irradiation process from crossing between the first region and the second region.

3. The apparatus of claim 1, wherein the stream of process gas is streamed from a bottom region to a top region of the process chamber.

4. The apparatus of claim 1, wherein the stream of process gas is streamed from a top region to a bottom region of the process chamber.

5. The apparatus of claim 1, wherein the at least one process gas outlet comprises one or more slits.

6. The apparatus of claim 1, wherein the at least one process gas outlet comprises one or more nozzles.

7. The apparatus of claim 1, wherein at least two sub-streams of process gas are generated by the stream generating unit streaming into the process chamber via at least two different process gas outlets.

8. The apparatus of claim 7, wherein the at least two sub-streams at least partially overlap.

9. The apparatus of claim 7, wherein the at least two sub-streams are adjacent.

10. The apparatus of claim 1, wherein the stream of process gas is configured to circulate back into the first region a particle from the first region moving into the stream of process gas.

11. The apparatus of claim 1 further comprising a stream of process gas over a build plane generated by the stream generating unit or an additional stream generating unit.

12. The apparatus of claim 1 further comprising a suction stream of process gas from the process chamber generated by the stream generating unit or an additional stream generating unit.

13. The apparatus of claim 1 further comprising a passageway between the stream of process gas and the second region, wherein the tool carrier can pass at least partially through the passageway when being inserted from the second region into the first region.

14. The apparatus of claim 13, wherein a chamber separation device is configured to generate the passageway.

15. The apparatus of claim 1 wherein the tool carrier comprising the coater is configured to be inserted through the stream of process gas from the second region into the first region, to apply build material on a build plane within the first region, and then be retracted through the stream of process gas from the first region to the second region.

16. The apparatus of claim 15, wherein the stream of process gas is configured to remove build material particles and/or residues deposited on or adhered to the coater as the coater passes through the stream of process gas.

* * * * *